United States Patent [19]

Fay

[11] Patent Number: 4,957,425
[45] Date of Patent: Sep. 18, 1990

[54] APPARATUS FOR PRODUCING SHAPED PRODUCTS

[76] Inventor: Rudolph J. Fay, 6911 Wildflower Trail, Cincinnati, Ohio 45230

[21] Appl. No.: 352,404

[22] Filed: May 15, 1989

[51] Int. Cl.$^5$ .............................................. B29C 43/50
[52] U.S. Cl. ..................................... 425/362; 264/335; 425/107; 425/314; 425/437; 425/520
[58] Field of Search ............... 425/362, 437, 100, 220, 425/310, 314, 107, 518, 520; 264/335

[56] References Cited

U.S. PATENT DOCUMENTS

| | | | |
|---|---|---|---|
| 206,771 | 8/1878 | Caldwell | 425/362 X |
| 230,348 | 7/1880 | Schu | 425/362 X |
| 289,397 | 12/1883 | Dietz | 425/362 X |
| 713,570 | 11/1902 | Monroe | 425/362 X |
| 1,364,590 | 1/1921 | Sharpe | 425/362 X |
| 1,423,760 | 7/1922 | Fairchild | 264/335 X |
| 2,774,313 | 12/1956 | Lombi | 425/362 X |
| 3,205,837 | 9/1965 | Fay | 425/362 X |
| 3,427,649 | 2/1969 | Fay | 264/335 X |
| 3,469,540 | 9/1969 | Werner | 425/362 X |
| 4,212,609 | 7/1980 | Fay | 425/100 |

FOREIGN PATENT DOCUMENTS 929194 5/1982 U.S.S.R. ................................ 425/362

Primary Examiner—Richard L. Chiesa
Attorney, Agent, or Firm—Wood, Herron & Evans

[57] ABSTRACT

An improved machine for producing a configurated and specified weight product in die cavities of a rotary die roll, each of the die cavities being defined by a configurated sidewall and a porous bottom wall. During each revolution of the die roll, a batch of the product is forced into each cavity if the cavities pass a feed hopper. Upon continued rotation of the die roll, the bottom walls of the cavities are moved outwardly to force the configurated products from the die cavities, while simutaneously, air at a pressure greater than atmospheric pressure is directed through the porous bottom walls so that the configurated product is forced off of the bottom wall and onto a conveyor located beneath the die roll. The machine includes improved means for directing air to the underside of the die roll, improved means for supporting the porous bottom walls from movable flight bars located internally of the die roll, improved means for lubricating the flight bars and rollers from which the flight bars are mounted, and improved means for feeding product from a hopper to the cavities of the die roll.

23 Claims, 7 Drawing Sheets

APPARATUS FOR PRODUCING SHAPED PRODUCTSAPPARATUS FOR PRODUCING SHAPED PRODUCTS

This invention relates to a method and apparatus for producing specific shapes and weights of products and, more particularly, to apparatus for producing specific shapes and weights of food products within configurated die cavities.

In U.S. Pat, No. 4,212,609 there is disclosed a method and machine for producing a configurated and specified weight product in die cavities of a rotary die roll, each of the die cavities being defined by a configurated sidewall and a porous bottom wall. During each revolution of the roll a batch of the product is forced into each cavity as the cavities pass beneath a hopper. Upon continued rotation of the roll, the bottom walls of the cavity are moved outwardly so as to force the configurated products from the die cavities. Simultaneously with the outward movement of the cavity bottom wall, air is directed through the porous bottom walls so that the configurated product is forced off the wall and onto a conveyor located beneath the die roll.

The die cavities of the rotary die roll of the above-identified patent are arranged in longitudinal rows circumferentially spaced about the periphery of the die roll. Air pressure is supplied to the underside of all of the die cavities in a single longitudinal row of the die roll through a common airflow passage. One problem characteristic of the machine disclosed in the above-identified patent is that the air pressure supplied to the underside of the die cavities varies over the length of the row, generally being higher in those cavities located adjacent to the inlet of the air pressure and lower at the cavities further spaced from the inlet of the air pressure. This differing pressure can result, in the case of some products, in difficulty dislodging the products from those die cavities spaced furthest from the air pressure inlet.

The machine disclosed in the above-identified patent is also subject to periodic clogging of the porous bottom walls of the die cavities. This periodic clogging has been traced in part to food product working itself into the air supply passages of the die roll through which air is supplied to the underside of the die cavities and then clogging either those passages or the underside of the porous bottom walls of the cavity. pressurize the food product and cause it to move from a hopper into the die cavities of the die roll. The nip between the downstream one of the feed rolls and the die roll has a shearing knife located therein, which shearing knife is operative to shear pressurized product from the top of the die cavities as the filled cavities pass the shearing knife. One problem which may occur when the machine of the above-identified patent is utilized to fill cavities which have a relatively long dimension in the circumferential direction of the roll is that the drag of the product over the surface of the shearing knife tends to force the product into the trailing end of the cavity and thereby distort the configuration of the product formed in the cavity.

Another problem may be caused by the shearing knife if any solid object works itself into the cavity and is of too large a dimension to be fitted into the cavity. In that event, the solid object may cause breakage of the machine.

In the use of the machine of the above-identified patent, there is sometimes a tendency in the case of some products for product material contained in the pressure zone between the feed rolls and the die roll to be excessively worked and become excessively hard before the product material is forced dough or candy mix. If worked excessively, such materials can cause excessive pressure to be built up in the machine and even cause machine breakdown.

The prior art machine described in the above-identified patent is characterized by support rolls located beneath the die roll, which support rolls carry the weight of the die roll, as well as the pressure created in the pressure zone between the feed rolls and the die roll. These support rolls have been found to be subject to deflection unless made very massive, and this deflection can have the adverse effect of changing the dimension of the product deposited in the cavities of the die roll and the resulting weights of those products.

The machine disclosed in the above-identified patent is also characterized by flight bars mounted internally of the die roll, which flight bars carry and support pistons upon which the movable porous bottom walls of the die cavities are supported. The flight bars are radially movable internally of the die roll under the control of an eccentric cam such that as the die roll rotates, the flight bars and attached pistons and bottom walls of the die cavities are moved radially inwardly and outwardly within the die roll. Another problem characteristic of the above-identified machine is that of maintaining accurate alignment between the flight bars, the pistons, and the piston-receiving cavities of the die roll during manufacture and assemblY of the machine.

It has been an objective of this invention to provide a new and improved machine for producing configurated products in die cavities of a die roll, which machine overcomes the problems described hereinabove.

More specifically, it has been one objective of this invention to provide a new and improved machine for producing configurated products in die cavities of a die roll wherein the bottom of each cavity is defined by a porous bottom wall through which gas is directed as the products are ejected from the cavities and in which the air pressure to the underside of the porous bottom walls of all of the die cavities in a longitudinal row of cavities is equalized.

Still another objective of this invention has been to provide a new and improved machine for producing configurated products in die cavities of a die roll wherein the bottom surface of the cavities of the die roll are formed by movable air-pervious bottom walls and in which the underside of the bottom walls and the air passages to those bottom walls are not exposed to product and subject to becoming clogged by product inadvertently directed into such air passages and underside of the die cavity bottom walls.

Still another objective of this invention has been to provide a new and improved machine for producing configurated products in die cavities of a die roll wherein the machine comprises a new and improved shearing knife for shearing product from the top of the filled cavities, which improved shearing knife has a slip surface in contact with the product to prevent distortion of the product resulting from frictional contact between the shear knife and the product in the cavity.

Still another objective of this invention has been to provide a new and improved machine for producing configurated products in die cavities of a die roll wherein solid objects inadvertently introduced into the die cavities cannot cause breakage of the machine when those solid objects are forced into contact with the shear knife of the machine.

Still another objective of this invention has been to provide a new and improved machine for producing configurated products in die cavities of a die roll in which the product is forced by feed rolls from a pressurized zone into the cavities of the roll and wherein the product is not excessively worked while contained in the pressure cavity defined between the feed rolls and the die roll.

Still another objective of this invention die roll in which the die roll is not subject to deflection and changing of the dimensions of configurated products formed in the die cavities of the roll.

The machine of this invention which accomplishes these objectives comprises a rotary die roll, which die roll has longitudinally extending rows and circumferentially extending columns of die cavities located about the circumference of the die roll. Located within the bottom of each of these die cavities is an air-pervious porous bottom wall. During each revolution of the roll, a batch of the product is forced into each cavity as the cavities pass through a pressure zone into which product is forced from a hopper by a pair of feed rolls. Upon continued rotation of the die roll, the filled cavities move past a cutoff knife located in the nip between the downstream feed roll and the die roll. That cutoff knife is operative to shear excess product from the top of the filled die cavities. Thereafter, and upon continued rotation of the die roll, gas is forced through the porous bottom walls of the die cavities as the bottom walls are extended outwardly so that the configurated product is forced out of the die cavities and off of the bottom walls of the cavities onto a conveyor located beneath the die roll. In order to prevent clogging of the airflow passages to the underside of the bottom wall of the die cavity and the resulting clogging of pores on the underside of the bottom wall of the die cavity, gas flow to the underside of the bottom wall of the die cavity is routed through pistons upon which the bottom walls of the die cavities are mounted. Those passages of the pistons contain adjustable airflow restrictors so as to enable the airflow to the porous bottom walls of a row of cavities to be adjusted and equalized. The cutoff knife for shearing product from the top of a filled cavity has a Teflon product contacting surface and is resiliently mounted from a piston rod of a pneumatic cylinder such that the knife may be forced back out of the way of any foreign object which may find its way into a die cavity. The die roll is supported from a central hub and radial spokes rather than from supporting rolls such that excessive pressure in the pressure chamber between the feed rolls and the die roll does not distort the size, shape and weight of products deposited on the conveyor from the die cavities.

The primary advantage of the machine of this invention is that it solves the problems described hereinabove which have characterized prior art machines.

BRIEF DESCRIPTION OF THE DRAWINGS

These and other objects and advantages of this invention will be more readily apparent from the following description of the drawings in which:

FIG. 7 is an enlarged, cross-sectional view of the area encircled by line 7—7 of FIG. 3 illustrating the cutoff or shearing knife in greater detail.

DETAILED DESCRIPTION OF THE DRAWINGS

Figure 1:
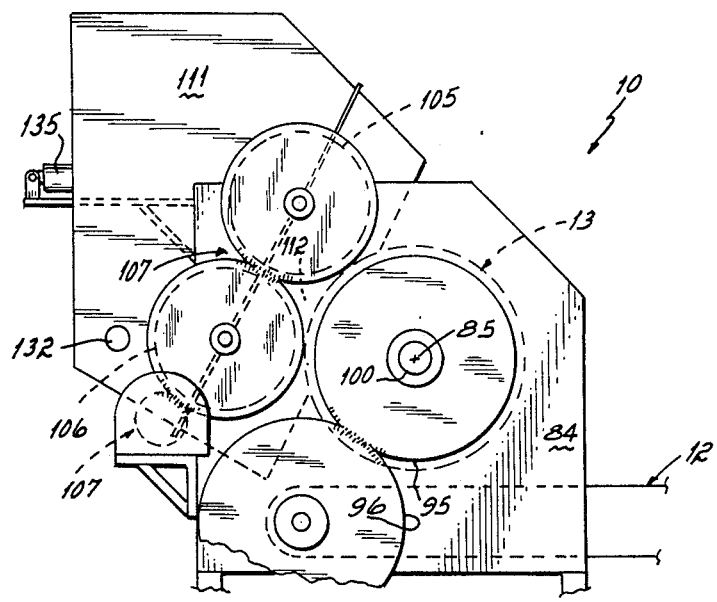
FIG. 1 is a partially diagrammatic side elevational view of an apparatus for practicing the invention of this application.
Figure 2:
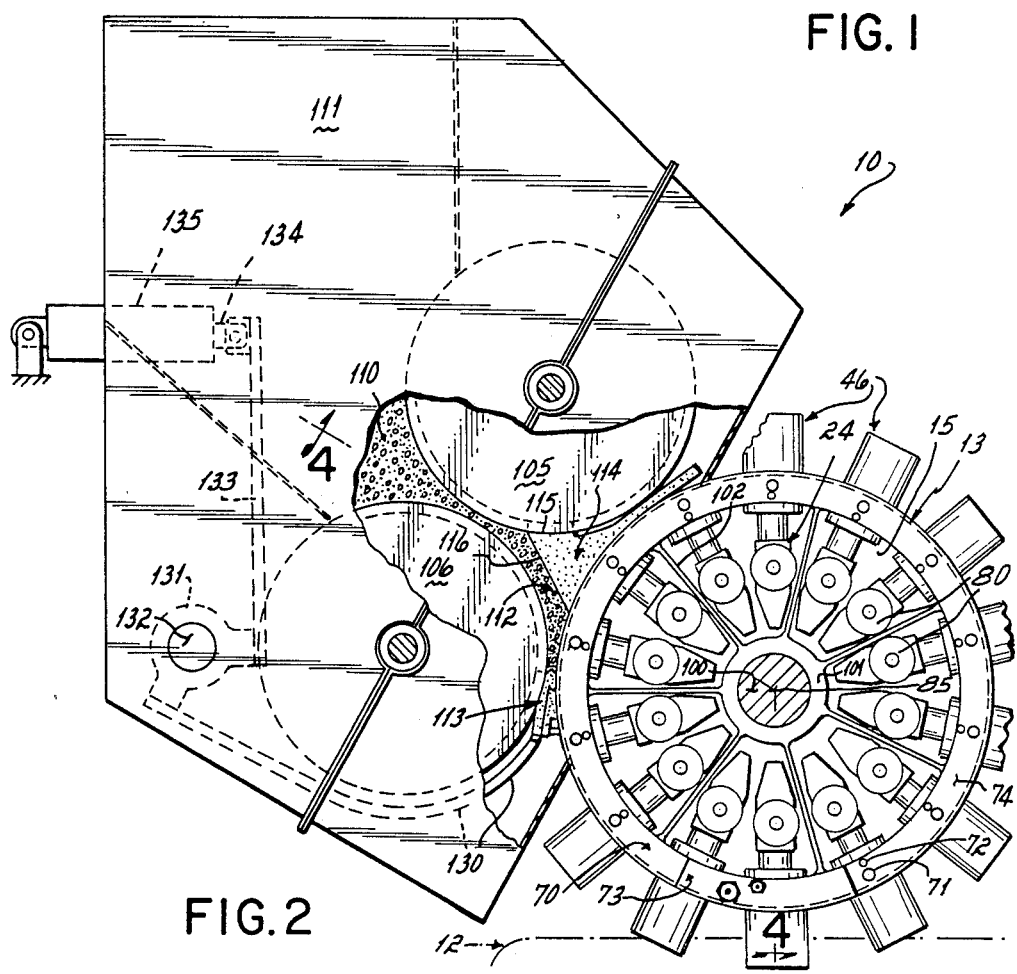
FIG. 2 is an enlarged view, partially broken away, similar to FIG. 1.
Figure 3:
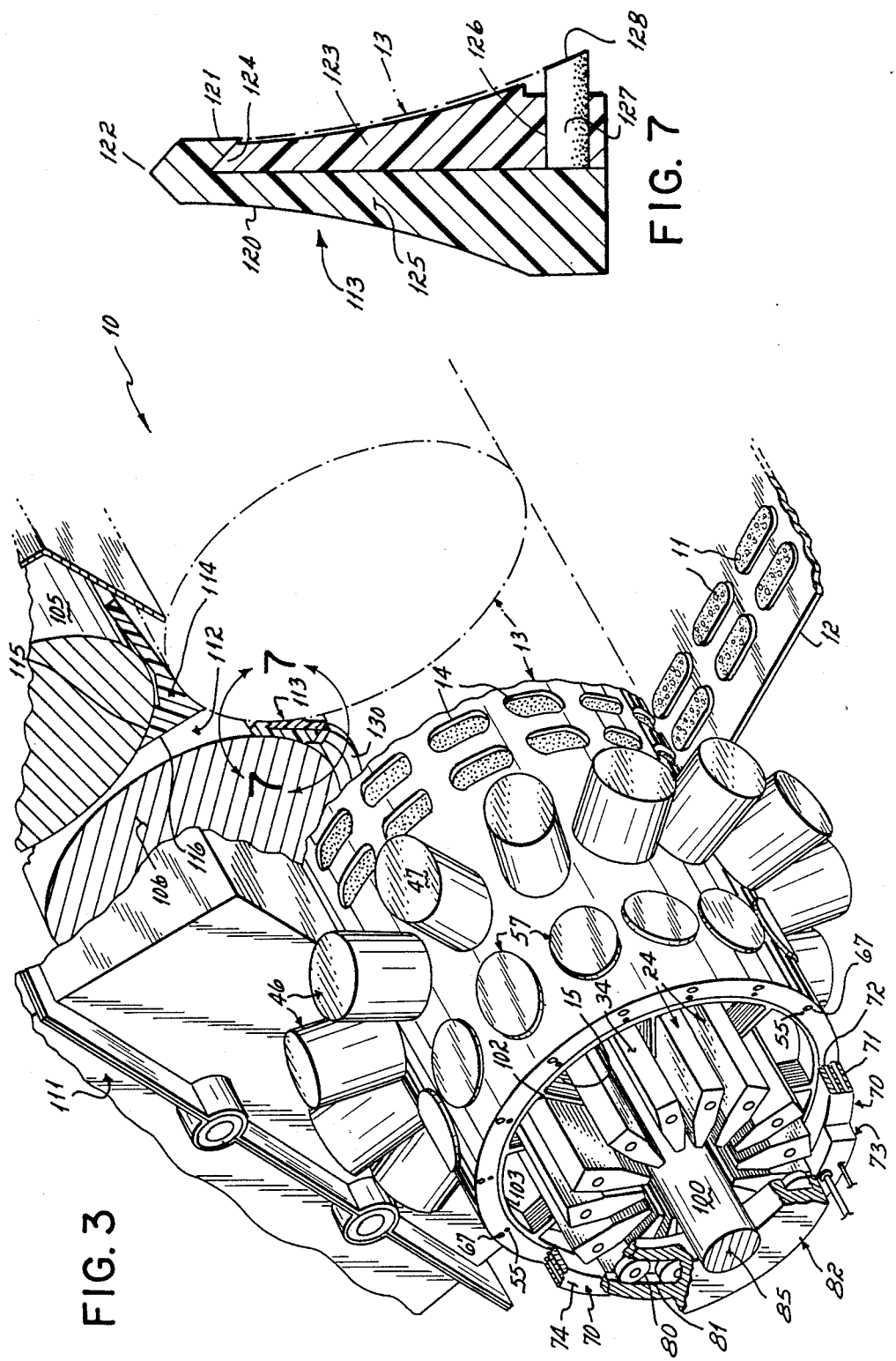
FIG. 3 is a perspective view, partially broken away, of a portion of the apparatus of FIG. 1.

Referring first to FIGS. 1, 2 and 3, there is illustrated a preferred embodiment of a machine 1? incorporating the invention of this application. This machine is illustrated as being used to make up elongated candy patties 11 and to deposit them on a conveyor 12 as the conveyor moves beneath a rotary die roll 13. While the machine 10 is illustrated and described as being used to make up candy patties, it could as well be used to create other forms of configurated product, such as cookies from cookie dough or sausage or meat patties from ground-up meat, and those configurated products could be deposited on other substrates on a conveyor belt, such as onto conveyorized dough products, etc.

The rotary die roll 13 of the machine 10 includes a plurality of radial cavities or openings 14 which extend from the periphery of the die roll 13 into the hollow interior 15 thereof. The cavities are arranged about the roll 13 in a series of longitudinal rows and circumferential columns. Of course, the cavities 14 may be arranged in any desired pattern and may be shaped into any desired peripheral configuration.

With particular reference now to FIGS. 4–7, it will be seen that there are piston heads 16 slidably mounted within each of the die cavities 14. On its outer end, each die piston 16 supports a gas-pervious sintered metal die 17 through which, as explained more fully hereinafter, air or other gas is directed into the cavities 14 from the underside of the sintered metal dies 17.

In addition to the rows and columns of cavities 14 for supporting the die pistons 16 and sintered metal dies 17, near each end of the die roll 13 there is a first circumferential column of cavities 20 which slidably supports guide rods 21, and a second circumferential column of cavities 22 which slidably supports gas supply pistons 23. The guide rod receiving cavities 20 and the gas supply cavities 22 of the die roll are equal in number to the number of rows of die cavities 14 and are longitudinally aligned with the rows.

Figure 6:
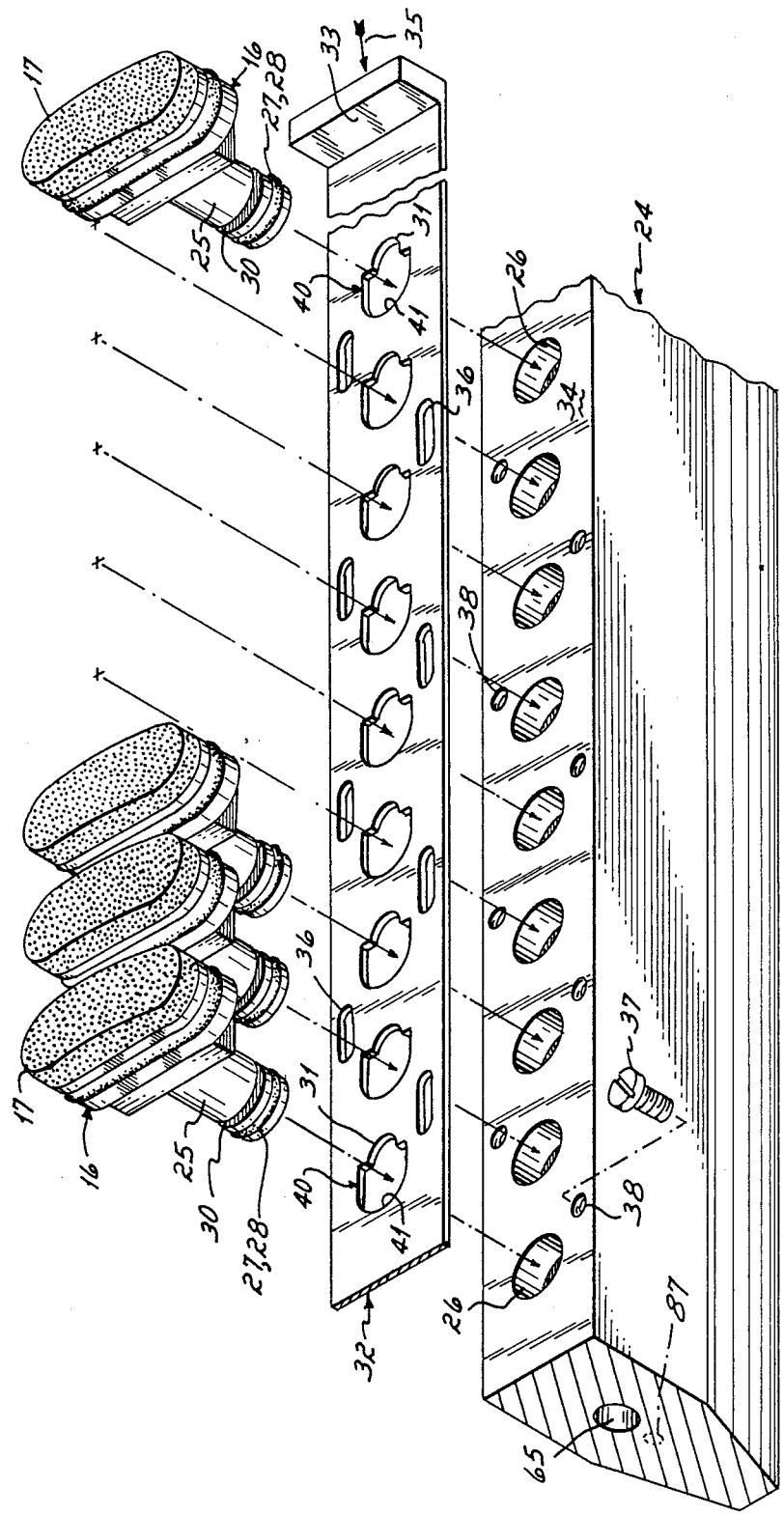
FIG. 6 is an exploded perspective view of a portion of one flight bar of the apparatus of FIG. 4 and the pistons mounted within that flight bar.

Located within the die roll 13 interiorly of each row of longitudinally aligned die cavities 14 are a plurality of flight bars 24. These flight bars generally extend for the length of the die roll and function to support the inner ends of the rods 25 of pistons 16, the guide rods 21, and the gas supply pistons 23. To this end, the flight bars 24 have longitudinal rows of holes 26 formed therein for the reception of the inner ends of the longitudinal rows of piston rods 25. These inner ends of the piston rods 25 have annular grooves 27 formed therein for the reception of 0-rings 28 which form a seal between the FIGS. 4A and 6, the inner end of each piston rod 25 has an annular groove 30 formed therein. This groove 30 functions to receive an arcuate section 31 of a locking bar 32 which locks the inner ends of the piston rods 25 to the flight bars 24. With particular reference now to FIG. 6, it will be seen that each locking bar 32 comprises a flat rectangular plate of sheet metal having an upstanding lip 33 at one end thereof. Each of these flat plates of sheet metal rests atop the outer surface 34 of the flight bars 24 and is longitudinally slidable on the top surface as indicated by the arrow 35.

Each locking bar 32 has a plurality of longitudinally extending slots 36 formed therein. Cap screws 37 extend through these slots and are threaded into threaded bores 38 of the flight bar. The heads of the screws 37 are larger than the width of the slots 36 such that the screws 37 secure the locking bars 32 to the outer surface 34 of the flight bars, but permit longitudinal movement of the locking bar 32 relative thereto to the extent of the length of the slots 36.

Spaced along the length of the locking bar 32 there are a plurality of equidistantly spaced keyhole slots 40, which slots are spaced apart or located on the same centers as the holes 26 in the flight bar 24. These keyhole slots have a large diameter section 41 through which the piston rods 25 may freely pass and a small radiused section 31 of the same radius as the grooved section 30 of the piston rods 25. Consequently, all that is required to secure the piston rods 25 within the flight bar 24 is to insert the inner ends of the piston rods 25 through the keyhole slots 40 of the locking bar 32 and into the holes 26 of the flight bar. The locking bar 32 is then moved longitudinally so as to insert the small radiused section 31 of the keyhole slot into the grooves 30 of the piston rods 25. Thereby, the piston rods are locked to the flight bars 24.

In order to secure the guide rods 21 to the flight bar, each guide rod comprises a tubular sleeve having a counterbored hole 42 extending longitudinally therethrough. This counterbored hole receives a bolt 43, the inner end of which is threaded into a threaded hole 44 of the flight bar. The head of the bolt 43 contacts a shoulder in the counterbored hole 42 so as to secure the sleeve 45 of the guide rod 21 to the flight bar 24.

The guide rods 21 are slidably mounted within cylinders 46. These cylinders are tubular in shape and have a closed outer end 47. The cylinders are secured to the periphery of the die roll 13 by machine screws 48 which extend through a peripheral annular flange 50 of the cylinders 46 and are threaded into threaded bores of the die roll 13. Mounted interiorly of each cylinder 46 there is a cup-shaped sleeve 51. This sleeve 51 has an internal bore sized so as to permit sliding movement of the guide rod 21 internally of the sleeve. In order to provide lubrication between the bore of the sleeve 51 and the periphery of the guide rod 21 there is a longitudinal groove 52 in the periphery of the sleeve 51 which communicates at the upper end with a radial bore 53 of the sleeve 51 and at the lower end with a radial bore 54 of the cylinder 46. The bore 54 in turn communicates with a lubricating or oil hole passage 55 which interconnects one end 56 of the die roll 13 with the guide rod lubricating port 54 of the cylinder 46.

Mounted in each of the gas supply cavities 22 of the die roll 13 there is a closed-end cylinder 57. This cylinder has an internal bore 58 within which the gas supply pistons 23 are slidable. To secure the cylinders to the roll, each cylinder 57 has a radial flange 60 through which machine screws 61 extend and are threaded into threaded bores of the die roll 13.

In order to secure the gas supply pistons 23 to the flight bars 24 there is a C-ring 62 which extends into an annular groove of the piston 23. This C-ring is in turn secured to the flight bar 24 by a screw (not shown).

In order to supply gas or air to the underside of the sintered metal dies 17 there is an axial gas flow passage 63 which extends for the length of each of the piston rods 25 and pistons 16. These passages 63 each communicate at their inner end with a gas flow passage 64 of the flight bar 24. The gas flow passages 64 are each aligned in a longitudinal row with holes 26 and communicate with a common longitudinally extending gas flow passage 65, which in turn is connected to and communicates with a gas supply passage 66 which extends axially through each of the gas supply pistons 23. The passage 66 in each gas supply piston 23 in turn is open to the interior of the cylinders 57. The interior of each of these cylinders 57 is in turn connected to a longitudinally extending gas supply passage 67 in the rotary die roll 13, which passage 67 opens to the end 56 of the die cavity. Thus, each row of die cavities 14 in the rotary die roll 13 is longitudinally aligned with an airflow passage 67 and a lubricant or oil hole supply passage 55, the number of such passages being equal to the number of longitudinally extending die cavities in the roll.

Mounted on one end of the rotary die roll 13 there is a port plate 70 which is fixedly secured to and rotates with the die roll 13. This port plate has longitudinally extending passages 71 and 72 longitudinally aligned with and in fluid communication with the air and oil flow passages 67, 55, respectively, in the die roll 13.

Air at a pressure above that of the atmosphere, as for example, at 50 pounds per square inch, is supplied through the passages 71 of the port plate 70, and oil or lubricant is supplied through the passages 72 as those passages of the port plate move past an air and lubricant supplY shoe 73. This shoe is sealingly engaged with outermost side edge 74 of the port plate 70. The shoe has a pair of arcuate recesses formed on its inner surface which communicates with the air and lubricant supply passages 75, 76 of the shoe such that air and lubricant are supplied to the air and lubricant supply passages 71, 72 of the port plate as those passages of the port plate move past the shoe. Air supplied to the passage 71 of the port plate flows through the passage 67 of the die roll 13 through the cylinder 57 and piston 23 to the longitudinal passage 65 in the flight bar 24. From the longitudinal passage 65 of the flight bar, that air pressure is directed through the gas flow passages 63 of the piston rods 25 and pistons 16 to the underside of each of the sintered metal dies 17 located in a longitudinal row of cavities 14 of the die roll 13. Simultaneously, lubricant is supplied from the port plate 70 and the passage 72 thereof through the passages 55, 54, 52 and 53 to the interior of the guide rod cylinders 46. Thereby, the guide rods are lubricated. A further lubricant passage, to be described below, continues through the cylinder 46 into the flight bar 24.

At its opposite ends, each flight bar 24 rotatably supports a guide roll 80. Each of these guide rolls 80 moves within an eccentric cam slot 81 (FIGS. 3 and 4) of a cam 82 secured to opposite side plates 83, 84 of the frame of the machine 10. As the die roll rotates, it causes the die pistons 16 and connected guide rods 21 to rotate with it. In the course of rotating about the axis 85 of the die roll, the rollers 80 attached to the ends of the flight bars 24 are caused to follow the cam slot 81. Because of the eccentricity of the slot 81 about the axis 85, the flight bars 24 and attached die pistons 16 and guide rods 21 are caused to move toward and away from the axis as the roll makes a complete revolution about the roll axis 85. This results in the sintered dies 17 attached to the outer ends of the pistons 16 being moved in and out relative to the die cavities 14.

In order to provide lubricant to the guide rollers 80 and the eccentric cam track or slot 81 within which those rollers are movable, the bolt 43 which connects the guide rods 21 to the flight bars 24 is provided with an axial lubricant flow passage 86. This passage communicates with a passage 87 of the flight bar 24, which in turn communicates with a longitudinally extending threaded bore 88 of the flight bar 24. The shaft 89 upon which the guide roll 80 is mounted is threaded into this bore and is provided with lubricant flow passages 90 and 91 through which lubricant is provided to the annulus 92 between the two races of roller 80. Thereby, lubricant supplied to the cylinders 46 of the guide rods 21 is communicated through the guide rods and through the flight bars to the rollers 80 and the eccentric cam track 81 within which those rollers are movable.

Referring now to FIG. 1, it will be seen that there is a ring gear 95 fixedly secured about the periphery of the die roll 13. This ring gear is drivingly connected with a drive gear 96 fixed to the shaft of conveyor 12, which, when driven from any conventional drive source, causes the die roll 13 and conveyor 12 to rotate at a predetermined and synchronized speed.

The die roll 13 is supported for rotation upon a central drive shaft 100, the axis of which is coincident with the axis 85 of the drive roll. This shaft is connected to the interior of the die roll 13 by hubs 101 and radial spokes 102 which extend between the hub 101 and an annular ring 103 fixed to the interior of the die roll 13. On its opposite ends, the drive shaft 100 is rotatably supported from the side plates 83, 84 of the machine.

Referring to FIGS. 1 and 2, there is mounted atop and to one side of the die roll 13 a pair of feed rolls 105, 106. These rolls are driven by a gear train 107 or other drive source at a speed such that the rolls feed product 110 contained within a hopper 111 downwardly between the feed rolls 105, 106 into a generally triangular cavity or pressure chamber 112 defined by the peripheral surfaces of the feed rolls 105, 106 and the peripheral surface of the die roll 13. The speed of the drive roll, and consequently of the feed rolls 105, 106, is determined so as to maintain product 110 within the cavity 112 and to force that product 7 downwardly into the open cavities 14 of the die roll 13 as those cavities move past the pressure chamber 112. To facilitate this feeding movement by the feed rolls 105, 106, the rolls generally have tapered longitudinal grooves on their
contained within the outer surface. To prevent food---.pressure chamber 112 from escaping between the feed rolls and the die roll, there is a cutoff knife 113 located at the downstream edge of the pressure chamber 112. This cutoff knife 113 acts as a seal between the downstream one of the feed rolls 106 and the die roll 13 at the nip between those two rolls. This cutoff knife also functions to force product 110 within the pressure chamber into the cavities 14 of the die roll 13 as the cavities move past the cutoff knife. At the upstream edge of the pressure chamber 112 there is a backing knife 114 located in the nip between the upstream pressure roll 105 and the die roll 13. This backing knife 114 functions as a seal in that nip and extends into the pressure chamber 112 a substantial distance so as to occupy a substantial portion of the generally triangular pressure chamber defined between the three rolls 13, 105 and 106. In fact, the backing knife occupies approximately one-half of the volume of the generally triangular pressure chamber 112. It has been found that by increasing the volume of this backing knife or seal between the feed roll 105 and die roll 13, product contained in the triangular pressure chamber 112 is not worked and does not become as hard from working as is the case when the backing knife does not extend into this chamber and does not occupy a substantial portion of the volume. In other words, the quantity of product material 110 contained in the generally triangular pressure chamber 112 is substantially reduced by the presence of the backing knife occupying substantially one-half of the volume of that pressure chamber. Thereby, the opportunity for product contained in that chamber to be worked is minimized. Working of many products, and particularly, many food products, such as candy or dough, can have an adverse effect on the product and cause it to become excessively hard. The presence of the backing knife in the pressure chamber reduces this working of the material contained in the pressure chamber.

The upper edge 115 of the backing knife 114 is generally arcuate in configuration for a fragment of its length and conforms in this area to the radius of the feed roll 105 against which the upper surface rides and forms a seal. Similarly, the lower surface of the backing knife is arcuate in configuration along a portion of its length and is of the same radius as the die roll 13 so that it effectively functions as a seal between the die roll and the backing knife. The leading edge 116 of the backing knife slopes downwardly and forms a ramp to force product downwardly into the die cavities 12 of the die roll 11 as those cavities pass the open portion of the pressure chamber 107, which open portion contains food product.

Figure 5:
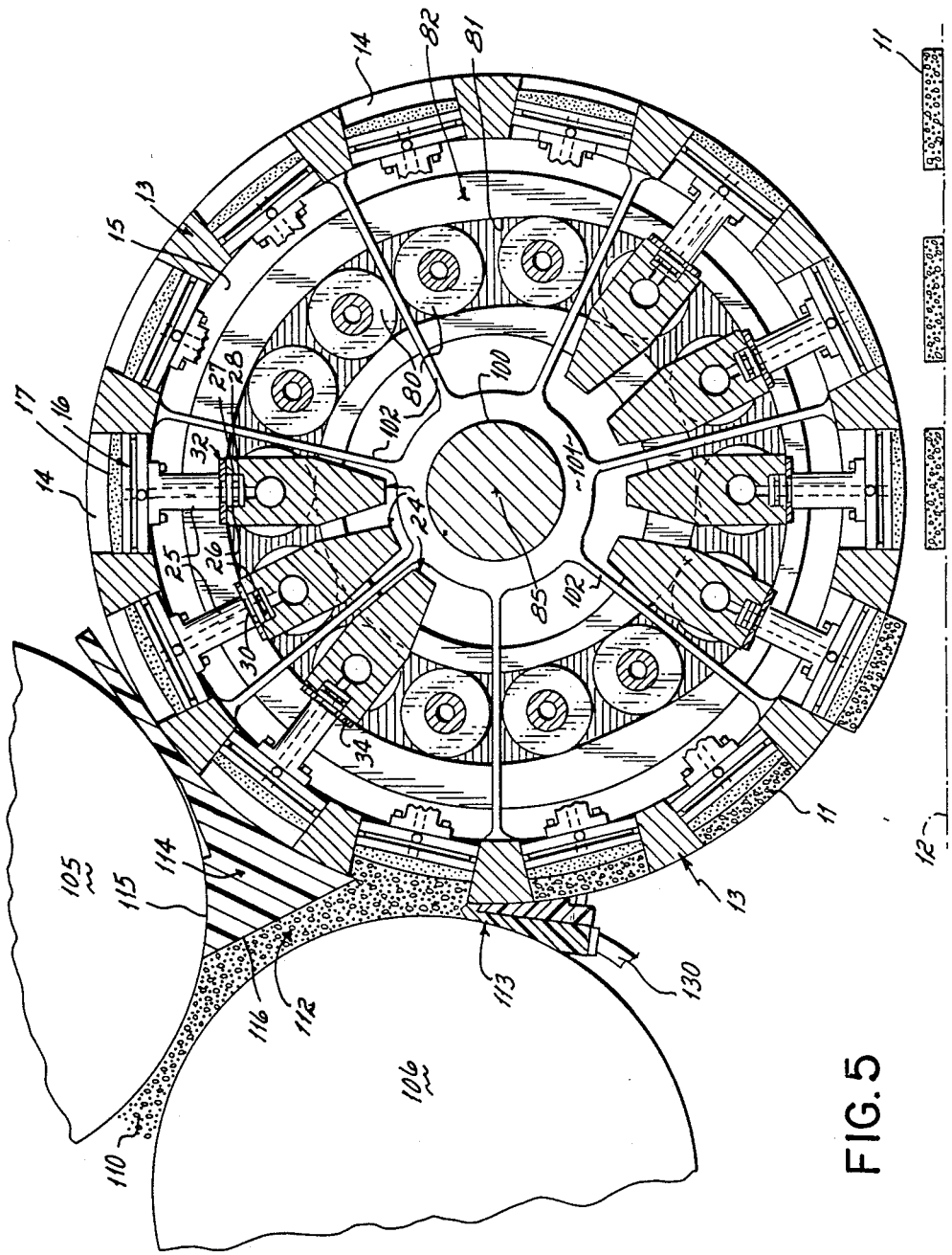
FIG. 5 is a cross-sectional view taken on line 5—5 of FIG. 4.

With reference to FIGS. 5 and 7, it will be seen that the cutoff knife 113 has a pair of arcuate surfaces 120, 121 which converge to a leading tapered knife edge 122. This knife edge functions to shear product from the mass of product contained in the pressure chamber 112 and the product contained in the die cavity 14 as the die cavity passes the knife edge 122 of the cutoff knife 113. One arcuate surface 113 of the cutoff knife conforms in radius to the radius of the backing roll 106 against which it rides, and similarly, the other arcuate surface 121 is of the same radius as the die roll 13 against which it rides. Thereby, the cutoff knife forms an effective seal between the downstream feed roll 106 and the die roll 13.

With particular reference to FIG. 7 it will be seen that the cutoff knife contains an insert 123, which insert occupies very nearly one-half of the cutoff knife 113. On its leading edge 124 the insert 123 is tapered so as to fit within an undercut lip on the leading edge of the body 125 of the cutoff knife 113. At its trailing or downstream edge, the insert 123 has a plurality of holes 126 which receive studs 127 extending outwardly from the cutout section of the body 125 of the cutoff knife 113. In the preferred embodiment, the cutoff knife 113 is made from nylon, a relatively hard, tough, wear-resistant material. The insert 123 is made from TEFLON (polytetrafluoroethylene) a much softer and less wear-resistant material, but a material with a much lower coefficient of friction than the nylon. The TEFLON (polytetraluoroethylene) insert in the nylon cutoff knife is provided so as to minimize the drag of configurated product 110 contained in the die cavities 14 across the surface of the cutoff knife. It has been found that in the case of elongated configurated products contained in the die cavities 14 or products which have a long dimension when measured along the circumference of the die roll 13 that the friction of the top surface of the configurated product 110 moving across the arcuate surface 121 of the cutoff knife 113 has the effect of causing that product to be pushed or dragged by the frictional contact of the top surface of the configurated product with the arcuate surface 121 toward the back of the die cavity 14. Thereby, the product can be distorted. The presence of the Teflon insert 123 in the cutoff knife 113, though, minimizes this drag and thereby avoids the distortion otherwise caused by this frictional contact.

Because the low friction material from which the insert 123 is made is relatively soft and subject to much faster wear than the material from which the remainder of the knife is made, the leading edge of the knife wraps about the insert 123 and extends slightly beyond the arcuate surface 121 of the insert. Similarly, the end surface 128 of the stud 127 is arcuate in configuration and extends slightly beyond the arcuate outer surface 121 of the insert 123. Thereby, contact of the surface 121 of the insert 123 with the peripheral surface of the rotary die roll 13 is avoided, and wear of that surface is minimized.

The cutoff knife 113 is in the preferred embodiment resiliently mounted upon a knife supporting arm 130. The purpose of this resilient mounting is to enable the cutoff knife to be pushed out of the nip between the feed roll 106 and the die roll 13 if ever solid product or a solid object inadvertently is introduced through the pressure chamber 112 into one of the die cavities 14. In that event, and in the absence of a resilient mounting of the cutoff knife 113, the knife or some component of the machine 10 could be broken. The resilient mounting of the knife, though, enables the knife to be pushed out of the way by any such foreign objects before breakage can occur. To that end, the arm 130 upon which the knife 113 is mounted extends downwardly beneath the feed roll 106 to a hub 131 mounted upon a shaft 132. The hub 131 is free to rotate on the shaft 132, but is restrained against such moVement by an arm 133 fixedly connected at one end to the hub 131 and pivotally mounted at the other end to the piston rod 134 of a pneumatic cylinder 135. The pneumatic cylinder 135 normally biases the cutoff knife into sealed engagement with the feed roll 106 and the die roll 13, while still leaving the knife free to be forced out of the nip between those rolls in the event that excessive pressure or pressure sufficient to overcome the bias of the pneumatic cylinder 135 is applied to the knife.

Operation

In the operation of the machine 10, product 110 and generally- a food product, such as cookie dough, candy mix or ground-up meat, which is to be deposited as configurated product onto a substrate, such as the conveyor 12, is loaded into the hopper 111. Before the machine is turned on, gas, and generally air, is supplied at a pressure well above that of atmosphere to the shoe 73, and a lubricant, such as a vegetable oil or vegetable oil mist, is supplied to the same shoe 73. The die roll 13 is then caused to be rotated by actuation of the drive roll, and simultaneously, actuation of the feed roll drive is initiated. This operation initiates feed of the bulk product 110 from the hopper 111 into the pressure chamber 11 contained between the feed rolls and die roll whereat the product 110 is pressurized and caused to be forced into the open die cavities 14 of the die roll 13 as those open die cavities pass the pressure chamber 112. In the course of moving past the pressure chamber, a predetermined weight or quantity of product 110 is forced into the open cavities. Any excess material is cut off or wiped off by the edge 122 of the cutoff knife 113 as the open die cavities pass the cutoff knife. As the die cavities move downwardly toward the 6 o'clock position, the sintered metal dies 17 are moved toward their outermost limit by the cam track 81. When a longitudinal row of cavities reaches approximately the 6 o'clock position, as viewed in FIGS. 2 and 5, the longitudinal air passage 67 which communicates with that row of cavities moves into communication with the arcuate air passage of the air supply shoe 73. Air is then supplied at a pressure generally on the order of 50 pounds per square inch from the an air supply line through passages 75, 71 to the passage 64 of die roll 13, passage 66 of the gas supply piston 23, and passage 65 in the flight bar 24 associated with that particular longitudinal row of die cavities 14, to the gas flow passage 63 of the pistons 25 associated with that row of sintered metal dies 17 contained within that longitudinal row of die cavities 14. Simultaneously, lubricant is supplied through the shoe 73 from a lubricant or oil supply line to the shoe's passage 76, and subsequently through the port plate 70 to the lubricant supply passage 55 of the die roll. From this passage, the lubricant is routed through the cylinders 46 and guide rods 21 into the longitudinally extending lubricant supply passage 87 to the guide rollers 80 of the flight bars 24 as those flight bars and the associated die cavities pass the lubricant and air supply shoe 73. As best illustrated in FIG. 5, upon continued counterclockwise movement of the dies 17 toward the 6 o'clock position, the configurated product of predetermined weight is blown free from the sintered metal dies 17 by the air which is then passed outwardly through the pores of the dies. This results in the configurated product 11 being deposited onto the moving substrate or conveyor 12 located beneath the die roll 13. Thereafter, upon continued counterclockwise movement of the die roll as viewed in FIG. 5, the sintered metal dies move inwardly or to a fully open position. By the time the sintered metal dies reach the 12 o'clock position, the dies are fully open and ready to receive a deposit of product from the pressure chamber 112.

Figure 4:
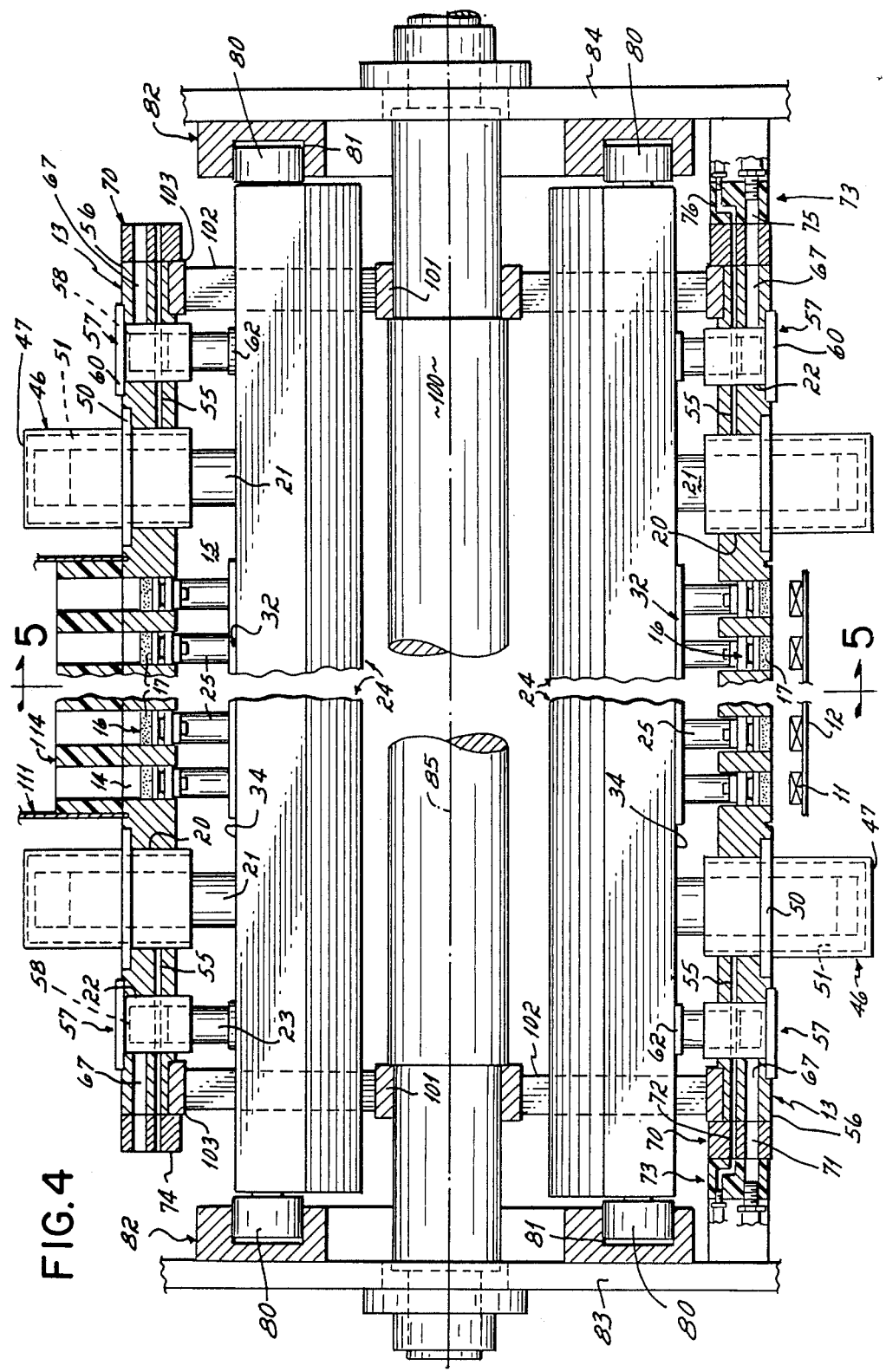
FIG. 4 is a cross-sectional view taken on line 4—4 of FIG. 2.
Figure 4A:
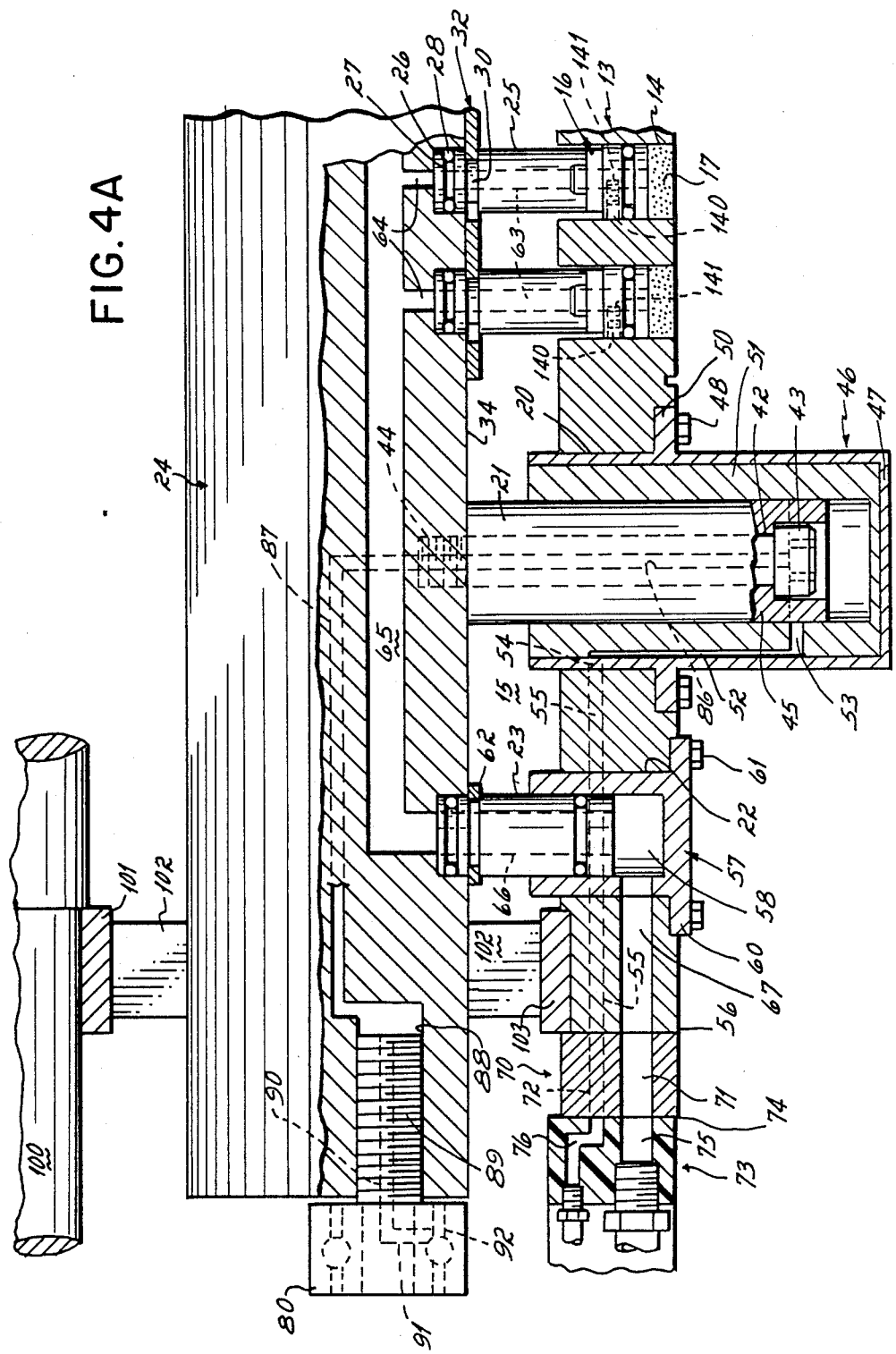
FIG. 4A is an enlarged cross-sectional view of a portion of the apparatus of FIG. 4.

With reference now particularly to FIGS. 4A and 6, it will seen that each of the air supply passages 63 in the piston rods 25 through which gas or air is supplied to the underside of the sintered metal die 17 is intersected by a threaded passage 140. Mounted in each of these passages there is an adjustable screw 141 which functions as an adjustable air restrictor. By threading or unthreading these screws 141 into or out of the threaded passages 140, greater or lesser gas flow may be provided to the underside of the sintered metal dies 17. In the operation of the machine of this invention, the air supply to the underside of all of the sintered metal dies in a longitudinal row of dies should be equal. But, in practice, and in the absence of any adjustment in the individual air supply to each die, it is difficult to obtain an equal air supply or equal air pressure to the underside of each of the sintered metal dies. The adjustable screws 141 provide this adjustment, and thereby enable the gas pressure to the underside of all of the sintered metal dies to be equalized.

In order to set the adjustment of all of the screws 141 to enable the air pressure to all of the sintered metal dies in a longitudinal row of dies to be equalized, water is injected into the air supply passages 65, 63 of a longitudinal row of sintered metal dies while the dies and attached pistons are mounted in the flight bar, but while the flight bar is supported in a jig remote from the die roll 13. In other words, with the flight bar 24, pistons 16, and sintered dies 17 disassembled from the die roll 13, the flight bar is mounted in a jig, and water is injected into the gas supply passage 65 of the flight bar. This water is supplied to the passage 65 at a pressure substantially above that of the atmosphere and is routed by the flight bar to the passages 63 and subsequently through those passages to the sintered metal dies 17. The water flows through those sintered metal dies and is sprayed from those dies a vertical height which is a function of the degree to which the passage 63 of each piston rod 25 is restricted by the screw 141 which intersects that passage. By adjusting the screws 141 until the water ejected from all of the dies mounted in a flight bar spray water an equal height above the sintered dies, the quantity of water, and consequently of air when the flight bar is subsequently assembled in the die roll, is equalized. Thereby, a very simple method is provided for adjusting the airflow to each of the sintered dies to enable product to be ejected from the dies simultaneously as a consequence of the airflow through the dies acting on product contacting those dies.

Figure 8:
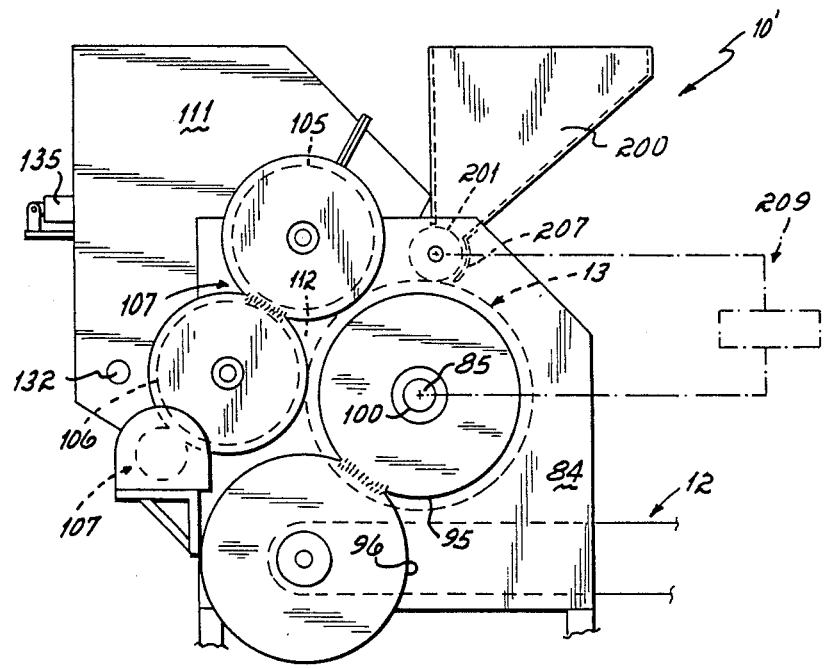
FIG. 8 is a partially diagrammatic side elevational view of a second modification of apparatus for practicing the invention of this application.
Figure 9:
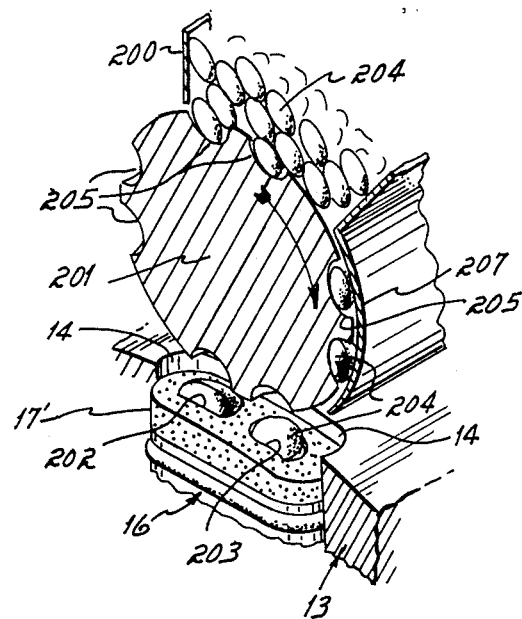
FIG. 9 is an enlarged perspective cross-sectional view through the auxiliary hopper of the apparatus of FIG. 8.

With reference now to FIGS. 8 and 9, there is illustrated a second modification of the machine of this invention. This second machine 10, is substantially identical to the first machine illustrated in FIGS. 1–7 of this application. It differs from the first machine 10 of FIGS. 1–7 only in that it adds to the machine 10 an auxiliary hopper 200 and a transfer or transport roll 201 for transporting solid objects from the auxiliary hopper 200 into the die cavities 14 of the die roll 13 while those cavities are open and the pistons are in the withdrawn position but before those open cavities are filled with moldable product 110 from the primary hopper 111. To the extent that the machine 10, of FIGS. 8 and 9 is identical to the machine 10 of FIGS. 1–7, those components of this second modification 10′, which are identical to the corresponding components of the first modification 10, have been given identical numerals. Those components which serve the same function but differ structurally from the corresponding component of the machine 10 have been given the same number, but followed by a prime mark.

In addition to the machine 10, having an additional or auxiliary hopper 200 and a transfer roll 201 which is not characteristic of the machine 10 of FIGS. 1–7, the machine 10′ also differs from the machine 10 in the configuration of the sintered metal dies 17′ In this modification, the sintered metal dies 17′ each have a pair of shallow recesses 202, 203 for the reception of solid objects transported to the cavities or openings 14 of the die roll 13 when the cavities are in or near the 12 o'clock position of the die roll. In one preferred embodiment of this invention, the solid objects or solid products 204 contained in the hopper and transported from the hopper to the die cavities 14 by the transfer roll 201 are nuts, and the product 110 contained in the primary hopper 111 is a candy mix. The auxiliary hopper 200, though, could as well contain other solid objects, )other non-food objects, such as other food objects or to be deposited into the cavities 14 before those cavities reach the pressure chamber 112 and receive moldable product 110 therefrom.

In order that the solid objects or products 204 will be metered into the die cavities 14 by the transfer roll, the transfer roll has a plurality of rows and columns of peripheral recesses 205 in the surface thereof. As those recesses pass beneath the auxiliary hopper 200, those recesses are filled with solid products 204, which products 204 are then transported by the transfer roll 201 to the die cavities 14. In order to maintain the objects 204 in the recesses 205 as the transfer roll rotates and transports those objects 204 in a clockwise direction relative to the counterclockwise rotation of the die roll 13, there is an object supporting guide plate 207 which extends downwardly from the trailing side of the hopper to a point near the peripheral surface of the die roll 13. This guide plate functions to prevent the objects 204 from falling out of the cavities or recesses 205 of the transfer roll in the course of passage between the hopper 200 and the die cavities 14.

Of course, the rotation of the transfer roll 201 must be synchronized with the rotation of the die roll 13 in order to ensure that the recesses 205 of the transfer roll mesh with or align with the recesses 202, 203 of the sintered metal dies 17, as the cavities of the transfer roll pass the cavities of the dies 17,. To that end, the rotational drive to the transfer roll is synchronized with the drive to the die roll 13 by a conventional synchronizing drive 209 indicated by phantom lines in FIG. 8. This synchronizing drive may be a gear drive or a timing belt or any conventional form of synchronizing drive between two drive shafts.

It will now be appreciated that the modification of FIGS. 8 and 9 is identical to the modification of FIGS. 1–7 except that this second modification adds to the machine 10 the capacity to feed auxiliary products from an auxiliary hopper 200 into the die cavities 14 of the die roll 13 prior to filling of those cavities with moldable product from the primary hopper 111 of the machine. In all other respects, the two modifications are identical.

While I have described only one preferred embodiment of the machine which is the subject of this invention, persons skilled in this art will have recognized various changes and modifications which may be made without departing from the spirit of my invention. Therefore, I do not intend to be limited except by the scope of the following appended claims:

I claim:

1. A machine for producing configurated products comprising
   a rotary die roll having an open interior and cavities arranged in a series of longitudinal rows and circumferential columns,
   movable dies disposed in each of said cavities, said dies being made from a porous material,
   means for introducing product into said cavities,
   means for ejecting said product from said cavities, said ejection means comprising
      means for moving said dies outwardly in said cavities until the outer surfaces of said dies are approximately flush with the surface of said roll, and gas supply means for supplying gas at a regulated pressure to the underside of said porous material dies as said dies are moved outwardly in said die cavities, said gas being operable to eject said product from said dies and to prevent said product from sticking to and clogging the pores of said dies, said means for moving said dies comprising longitudinally extending flight bars mounted within said die roll, said dies being mounted upon movable pistons, said pistons being attached to piston rods and said piston rods being mounted within said flight bars, means for effecting radial movement of said flight bars within said roll to effect movement of said dies relative to said roll, and said gas supply means including gas supply passages through said piston rods and pistons to said dies.

2. The machine of claim 1 wherein each of said gas supply passages through said piston rods and pistons includes an independently adjustable restriction for independently adjusting gas flow to each of said dies.

3. The machine of claim 1 which further includes a pair of feed rolls located in close adjacency to said die roll so as to define a nip between each of said pressure rolls and said die roll, said feed rolls and die roll defining a generally triangular cross section product material pressure chamber therebetween, hopper means for supplying product material to said feed rolls, a cutoff knife extending into the nip between one of said pressure rolls and said die roll, a backing knife located between said other of said pressure rolls and said die roll, said backing knife extending into and occupying a substantial portion of the volume of said product material pressure chamber so as to reduce the quantity of product material contained in said pressure chamber and the working of the product material contained in said pressure chamber.

4. The machine of claim 1 which further includes a pair of feed rolls located in close adjacency to said die roll so as to define a nip between each of said pressure rolls and said die roll, hopper means for supplying product material to said feed rolls, a cutoff knife having a cutting edge extending into the nip between one of said feed rolls and said die roll, and a pneumatic cylinder for forcing and maintaining said cutoff knife in said nip so that said cutoff knife may be forced from said nip in the event of excessive pressure against the cutting edge of said knife.

5. The machine of claim 1 wherein said die roll is generally tubular and is supported from a central support shaft and spokes extending between said central support shaft and said die roll.

6. The machine of claim 1 which further comprises a flight bar locking plate slidably mounted on one side of said flight bar, said flight bar having a plurality of holes into which said piston rods extend, said flight bar locking plate having a plurality of keyhole slots through which said piston rods extend, and said piston rods each having an annular groove for reception of a narrow portion of one of said keyhole slots of said flight bar locking plate so as to lock said piston rods within said holes of said flight bar.

7. The machine of claim 1 which further comprises a roller mounted upon each of the opposite ends of each of said flight bars, said rollers being movable within eccentric cam track means fixedly mounted at the opposite ends of said die roll, a pair of guide cylinders fixedly mounted upon opposite ends of said die roll in radial alignment with each of said flight bars, a pair of guide rods extending from each of said flight bars, each pair of said guide rods being slidably received in a pair of said guide cylinders, and means for lubricating said guide rods and said rollers, said lubricating means comprising oil passage means extending from one end of said die roll to at least one of each pair of said guide cylinders and from said one of each pair of said guide cylinders through the guide rod slidably mounted in said one of each pair of said guide cylinders into a flight bar and through the flight bar to at least one of said rollers.

8. A machine for producing configurated products comprising a rotary die roll having an open interior and cavities arranged in a series of longitudinal rows and circumferential columns, movable dies disposed in each of said cavities, said dies being made from a porous material, means for introducing product into said cavities, means for ejecting said product from said cavities, said ejection means comprising means for moving said dies outwardly in said cavities until the outer surfaces of said dies are approximately flush with the surface of said roll, gas supply means for supplying gas at a regulated pressure to the underside of said porous material dies as said dies are moved outwardly in said die cavities, said gas being operable to eject said product from said dies and to prevent said product from sticking to and clogging the pores of said dies, and means for independently adjusting and presetting the gas pressure supplied to the underside of each of said porous material dies so as to enable the presssure supplied to all of said porous material dies to be equalized.

9. A machine for producing configurated products comprising a rotary die roll having an open interior and cavities arranged in a series of longitudinal rows and circumferential columns, movable dies disposed in each of said cavities, said dies being made from a porous material, means for ejecting said product from said cavities, said ejection means comprising means for moving said dies outwardly in said cavities until the outer surfaces of said dies are approximately flush with the surface of said roll, gas supply supplying gas at a regulated pressure to the underside of said porous material dies as said dies are moved outwardly in said die cavities, said gas being operable to eject said product from said dies and to prevent said product from sticking to and clogging the pores of said dies, a pair of pressure rolls located in close adjacency to said die roll so as to define a nip between each of said pressure rolls and said die roll, said feed rolls and die roll defining between them a generally triangular cross section product material pressure chamber therebetween, hopper means for supplying product material to said feed rolls, a cutoff knife extending into the nip between one of said pressure rolls and said die roll, and a backing knife located between said other of said pressure rolls and said die roll, said backing knife extending into and occupying a substantial portion of the volume of said generally triangular cross section product material pressure chamber so as to reduce the quantity of product material contained in said pressure chamber and the working of the product material contained in said pressure chamber.

10. The machine of claim 9 wherein said backing knife occupies approximately one-half of the volume of said generally triangular cross section product material pressure chamber.

11. A machine for producing configurated products comprising a rotary die roll having an open interior and cavities arranged in a series of longitudinal rows and circumferential columns, movable dies disposed in each of said cavities, said dies being made from a porous material, means for ejecting said product from said cavities, said ejection means comprising means for moving said dies outwardly in said cavities until the outer surfaces of said dies are approximately flush with the surface of said roll, gas supply means for supplying gas at a regulated pressure to the underside of said porous material dies as said dies are moved outwardly in said die cavities, said gas being operable to eject said product from said dies and to prevent said product from sticking to and clogging the pores of said dies, a pair of pressure rolls located in close adjacency to said die roll so as to define a nip between each of said pressure rolls and said die roll, hopper means for supplying product material to said pressure rolls, a cutoff knife having a cutting edge extending into the nip between one of said pressure rolls and said die roll, and cutoff knife support means for resiliently maintaining said cutoff knife in said nip so that said cutoff knife may be forced out of and away from said nip in the event of excessive pressure against the cutting edge of said cutoff knife.

12. The machine of claim 11 wherein said cutoff knife support means for resiliently maintaining said cutoff knife in said nip includes a pneumatic cylinder.

13. A machine for producing configurated products comprising a generally tubular rotary die roll having an open interior and cavities arranged in a series of longitudinal rows and circumferential columns, movable dies disposed in each of said cavities, said dies being made from a porous material, means for introducing product into said cavities, means for ejecting said product from said cavities, said ejection means comprising means for moving said dies outwardly in said cavities until the outer surfaces of said dies are approximately flush with the surface of said roll, gas supply means for supplying gas at a regulated pressure to the underside of said porous material dies as said dies are moved outwardly in said die cavities, said gas being operable to eject said product from said dies and to prevent said product from sticking to and clogging the pores of said dies, said means for moving said dies comprising longitudinally extending flight bars mounted within said die roll, said dies being mounted upon said flight bars, and said die roll being supported from a central support shaft and spokes extending from said central support shaft to the interior surface of said die roll, said flight bars being located between said spokes.

14. A machine for producing configurated products comprising a rotary die roll having an open interior and cavities arranged in a series of longitudinal rows and circumferential columns, movable dies disposed in each of said cavities, said dies being made from a porous material, means for introducing product into said cavities, means for ejecting said product from said cavities, said ejection means comprising means for moving said dies outwardly in said cavities until the outer surfaces of said dies are approximately flush with the surface of said roll, gas supply means for supplying gas at a regulated pressure to the underside of said porous material dies as said dies are moved outwardly in said die cavities, said gas being operable to eject said product from said dies and to prevent said product from sticking to and clogging the pores of said dies, said means for moving said dies comprising longitudinally extending flight bars mounted within said die roll, said dies being mounted upon movable pistons, said pistons being attached to piston rods and said piston rods being mounted within said flight bars, and a flight bar locking plate slidably mounted on each of said flight bars, said flight bars having a plurality of holes into which said piston rods extend, said flight bar locking plate having a plurality of keyhole slots through which said piston rods extend, and said piston rods each having an annular groove for reception of a narrow portion of one of said keyhole slots of said flight bar locking plate so as to lock said piston rods within said holes of said flight bar.

15. A machine for producing configurated products comprising a rotary die roll having an open interior and cavities arranged in a series of longitudinal rows and circumferential columns, movable dies disposed in each of said cavities, said dies being made from a porous material, means for introducing product into said cavities, means for ejecting said product from said cavities, said ejection means comprising means for moving said dies outwardly in said cavities until the outer surfaces of said dies are approximately flush with the surface of said roll, gas supply means for supplying gas at a regulated pressure to the underside of said porous material dies as said dies are moved outwardly in said die cavities, said gas being operable to eject said product from said dies and to prevent product from sticking to and clogging the pores of said dies, said means for moving said dies comprising longitudinally extending flight bars mounted within said die roll, said dies being mounted upon said flight bars, a roller mounted upon each of the opposite ends of each of said flight bars, said rollers being movable within eccentric cam track means fixedly mounted at the opposite ends of said die roll, a pair of guide cylinders fixedly mounted upon opposite ends of said die roll in radial alignment with each of said flight bars, a pair of guide rods extending from each of said flight bars, each pair of said guide rods being slidably received in a pair of said guide cylinders, and means for lubricating said guide rods and said rollers, said lubricating means comprising oil passage means extending from one end of said die roll to at least one of each pair of said guide cylinders and from said one of each pair of said guide cylinders through the guide rod slidably mounted in said one of each pair of said guide cylinders into one of said flight bars and through said one of said flight bars to at least one of said rollers.

16. A machine for producing configurated products comprising a rotary die roll having an open interior and cavities arranged in a series of longitudinal rows and circumferential columns, movable dies disposed in each of said cavities, said dies being made from a porous material, first means for introducing a first, non-moldable solid product into said cavities, second means for introducing a second moldable product into said cavities downstream of said first introducing means, means for ejecting said product from said cavities, said ejection means comprising means for moving said dies outwardly in said cavities until the outer surfaces of said dies are approximately flush with the surface of said roll, and gas supply means for supplying gas at a regulated pressure to the underside of said porous material dies as said dies are moved outwardly in said die cavities, said gas being operable to eject said product from said dies and to prevent said product from sticking to and clogging the pores of said dies.

17. A machine for producing configurated products comprising a rotary die roll having an open interior and cavities arranged in a series of longitudinal rows and circumferential columns, movable dies disposed in each of said cavities, said dies being made from a porous material, each of said dies having at least one product receiving recess formed in an outer surface thereof, first means for introducing a first product into said recesses of said dies, second means for introducing a second moldable product into said cavities, means for ejecting said products from said cavities, said ejection means comprising means for moving said dies outwardly in said cavities until the outer surfaces of said dies are approximately flush with the surface of said roll, and gas supply means for supplying gas at a regulated pressure to the underside of said porous material dies as said dies are moved outwardly in said die cavities, said gas being operable to eject said product from said dies and to prevent said product from sticking to and clogging the pores of said dies.

18. The machine of claim 17 wherein said first product comprises a solid, non-moldable product.

19. The machine of claim 18 wherein said first means comprises a hopper and means for transporting first product from said first hopper to said recesses of said dies.

20. The machine of claim 19 wherein said transporting means comprises a feed roll.

21. The machine of claim 17 wherein said first means comprises a first hopper and first transport means for transporting first product from said first hopper to said recesses of said dies, and said second means comprising a second hopper and second transport means for transporting said second moldable product from said second hopper to said cavities.

22. The machine of claim 21 wherein said second transport means comprises a pair of pressure rolls located in close adjacency to said die roll.

23. The machine of claim 22 wherein there is a nip defined between each of said pressure rolls and said die roll, said feed rolls and die roll defining a generally triangular cross section second moldable product material pressure chamber therebetween, a cutoff knife extending into the nip between one of said pressure rolls and said die roll, and a backing knife located between said other of said pressure rolls and said die roll, said backing knife extending into and occupying a substantial portion of the volume of said product material pressure chamber so as to reduce the quantity of moldable product material contained in said pressure chamber and the working of the product material contained in said pressure chamber.

* * * * *

UNITED STATES PATENT AND TRADEMARK OFFICE
CERTIFICATE OF CORRECTION

PATENT NO. : 4,957,425

DATED : September 18, 1990

INVENTOR(S) : Rudolph J. Fay

It is certified that error appears in the above-identified patent and that said Letters Patent is hereby corrected as shown below:

Col. 1, line 48, after "the cavity" insert --The machine disclosed in the above-identified patent utilizes a pair of feed rolls to--.

Col. 2, line 4, after "is forced" insert --into the die cavities of the die roll. This can be a problem with some products, such as those made from--.

Col. 2, line 31, change "assemblY" to --assembly--.

Col. 3, line 11, after "of this invention" insert --has been to provide a new and improved machine for producing configurated products in die cavities of a--.

Col. 4, line 25, change "1?" to --10--.

Col. 5, line 4, after "form a seal between the" insert --inner ends of the piston rods 25 and the holes 26. Additionally, and as may be seen most clearly in--.

Col. 6, line 45, change "supplY" to --supply--.

Col. 7, line 62, change "contained within the outer surface" to read as --outer surface--.

Col. 7, line 63, change "food---." to read as --food contained with in--

Col. 8, line 65, change "body !25" to --body 125--.

Col. 9, line 52, change "moVement" to --movement--.

Col. 9, line 65, change "generally- a" to --generally a--.

Col. 10, line 9, change "chamber 11" to --chamber 112--.

UNITED STATES PATENT AND TRADEMARK OFFICE
CERTIFICATE OF CORRECTION

PATENT NO. : 4,957,425

DATED : September 18, 1990

INVENTOR(S) : Rudolph J. Fay

It is certified that error appears in the above-identified patent and that said Letters Patent is hereby corrected as shown below:

Col. 11, line 40, change "machine 10" to --machine 10'--.

Col. 11, line 50, change "machine 10" to --machine 10'--.

Col. 11, line 59, change "machine 10" to --machine 10'--.

Col. 11, line 63, after "dies 17'" insert a period.

Col. 12, line 7, change ")other" to read as --such as other food objects or other--.

Col. 12, line 34, change "dies 17," to --dies 17'--.

Col. 13, line 36, after "die roll" insert --and--.

Col. 15, line 1, change "feed rolls" to read as --pair of pressure rolls--.

Col. 16, line 9, after "extending" insert --and radially movable--.

UNITED STATES PATENT AND TRADEMARK OFFICE
CERTIFICATE OF CORRECTION

PATENT NO. : 4,957,425

DATED : September 18, 1990

INVENTOR(S) : Rudolph J. Fay

It is certified that error appears in the above-identified patent and that said Letters Patent is hereby corrected as shown below:

Col. 18, line 47, change "feed rolls" to read as --pressure rolls--.

Signed and Sealed this

Third Day of November, 1992

Attest:

DOUGLAS B. COMER

Attesting Officer

Acting Commissioner of Patents and Trademarks